US011143152B2

(12) United States Patent
Tadokoro et al.

(10) Patent No.: US 11,143,152 B2
(45) Date of Patent: Oct. 12, 2021

(54) FUEL PIPE

(71) Applicant: SANOH INDUSTRIAL CO., LTD., Tokyo (JP)

(72) Inventors: Hayato Tadokoro, Koga (JP); Yuji Ozawa, Koga (JP); Seihau Lee, Koga (JP)

(73) Assignee: SANOH INDUSTRIAL CO., LTD., Tokyo (JP)

( * ) Notice: Subject to any disclaimer, the term of this patent is extended or adjusted under 35 U.S.C. 154(b) by 311 days.

(21) Appl. No.: 16/346,294

(22) PCT Filed: Jul. 26, 2017

(86) PCT No.: PCT/JP2017/027076
§ 371 (c)(1),
(2) Date: Apr. 30, 2019

(87) PCT Pub. No.: WO2018/078978
PCT Pub. Date: May 3, 2018

(65) Prior Publication Data
US 2020/0182209 A1   Jun. 11, 2020

(30) Foreign Application Priority Data

Oct. 31, 2016   (JP) .............................. JP2016-213547

(51) Int. Cl.
*F02M 55/02*   (2006.01)
*F02M 55/00*   (2006.01)
(Continued)

(52) U.S. Cl.
CPC .......... *F02M 55/02* (2013.01); *F02M 55/005* (2013.01); *F02M 63/0275* (2013.01); *F16L 19/0225* (2013.01)

(58) Field of Classification Search
CPC .... F02M 55/02; F02M 55/025; F02M 55/005; F16L 27/047; F16L 19/025; F16L 19/028; F16L 19/0283
See application file for complete search history.

(56) References Cited

U.S. PATENT DOCUMENTS 2,494,128 A * 1/1950 Holmquist ............ F16L 15/001
72/340
4,266,577 A * 5/1981 Usui .................... F02M 55/005
138/109
(Continued)

FOREIGN PATENT DOCUMENTS

DE      2631984 A1    1/1978
DE    19701561 A1 *  7/1998  ............ F16L 19/028
(Continued)

OTHER PUBLICATIONS

Extended European Search Report for related EP App No. 17865438.0 dated May 4, 2020, 7 pgs.
(Continued)

*Primary Examiner* — Micheal A Kessler
(74) *Attorney, Agent, or Firm* — Procopio, Cory, Hargreaves & Savitch LLP (57) ABSTRACT

Provided is a fuel pipe connected to a fuel distribution pipe distributing and supplying fuel to a plurality of fuel injection devices. The fuel pipe includes a pipe body and a connection head part fastened to the fuel distribution pipe by a cap nut. The connection head part includes a first curved portion curved in a circular shape in a reference cross-section including a central axis A of the fuel pipe and abutting against a seat surface formed on an inner peripheral surface of the fuel distribution pipe, a second curved portion curved in a circular shape in the reference cross-section and locked on a locking surface formed on an inner peripheral surface of the cap nut, and a straight portion extending linearly in the (Continued)

reference cross-section and interconnecting the first curved portion and the second curved portion.

8 Claims, 7 Drawing Sheets

(51) Int. Cl.
*F02M 63/02* (2006.01)
*F16L 19/02* (2006.01)

(56) References Cited

U.S. PATENT DOCUMENTS

| | | | | |
|---|---|---|---|---|
| 5,529,349 | A * | 6/1996 | Gibbs | F16L 19/02 |
| | | | | 285/332 |
| 8,196,967 | B2 | 6/2012 | Seifert et al. | |
| 11,022,082 | B2 * | 6/2021 | Yamazaki | F02M 55/004 |
| 2007/0246016 | A1 | 10/2007 | Scheffel et al. | |
| 2009/0151701 | A1 * | 6/2009 | Kato | F02M 55/02 |
| | | | | 123/470 |
| 2010/0059995 | A1 * | 3/2010 | Ciprich | F16L 19/045 |
| | | | | 285/341 |
| 2011/0204623 | A1 * | 8/2011 | Weick | F16L 19/0283 |
| | | | | 285/331 |
| 2012/0006298 | A1 * | 1/2012 | Watanabe | F16L 19/0286 |
| | | | | 123/468 |
| 2012/0169045 | A1 * | 7/2012 | Berghaus | B21D 39/04 |
| | | | | 285/332 |
| 2013/0307265 | A1 * | 11/2013 | Sekino | F16L 19/0283 |
| | | | | 285/382.5 |
| 2015/0008669 | A1 * | 1/2015 | Makino | B21D 19/08 |
| | | | | 285/354 |

FOREIGN PATENT DOCUMENTS

| | | |
|---|---|---|
| DE | 202004012959 U1 | 10/2004 |
| DE | 102005045731 A1 | 4/2007 |
| DE | 102006015652 B3 | 7/2007 |
| DE | 102007046203 A1 | 5/2008 |
| DE | 102007019464 A1 | 10/2008 |
| JP | 2000227183 A | 8/2000 |
| JP | 2003-021018 A | 1/2003 |
| JP | 2004-019541 A | 1/2004 |
| JP | 2007-077807 A | 3/2007 |
| JP | 2008-542601 A | 11/2008 |
| JP | 2011196259 A | 10/2011 |
| JP | 5394206 B2 | 1/2014 |
| JP | 5774127 B2 | 9/2015 |
| WO | 2006/125686 A1 | 11/2006 |

OTHER PUBLICATIONS

International Search Report for related International Application No. PCT/JP2017/027076, dated Aug. 29, 2017; 1 page.
International Preliminary Report on Patentability for related International Application No. PCT/JP2017/027076, dated May 9, 2019; 8 pages.

* cited by examiner

FUEL PIPE

CROSS-REFERENCE TO RELATED APPLICATIONS

This application is a U.S. National Stage entry of PCT Application No: PCT/JP2017/027076 filed Jul. 26, 2017, which claims priority to Japanese Patent Application No. 2016-213547, filed Oct. 31, 2016, the contents of which are incorporated herein by reference.

TECHNICAL FIELD

The present invention relates to a fuel pipe connected to a fuel distribution pipe distributing and supplying fuel to a plurality of fuel injection devices.

BACKGROUND ART

In a direct injection engine or the like, high-pressure fuel compressed by a high-pressure pump is distributed and supplied to a plurality of fuel injection devices by means of a fuel distribution and supply device. The fuel distribution and supply device is provided with a fuel pipe connected to the high-pressure pump, a fuel distribution pipe connected to the plurality of fuel injection devices, and a cap nut fastening the fuel pipe to the fuel distribution pipe. Once the cap nut is fastened, a connection head part of the fuel pipe locked in the cap nut is pressed to a seal surface of the fuel distribution pipe. As a result, the connection head part and the seal surface are sealed (see, for example, Patent Literature 1).

CITATION LIST

Patent Literature

Patent Literature 1: German Patent Application Publication No. 102005045731
Patent Literature 2: German Patent Application Publication No. 102007046203

SUMMARY OF INVENTION

Technical Problem

The connection head part is sandwiched between the seal surface of the fuel distribution pipe and a locking surface of the cap nut. Accordingly, once the cap nut is fastened, large stress is generated in the connection head part due to the axial force of the cap nut.

However, in a fuel distribution and supply device for gasoline, a fuel pipe made of stainless steel is used as a fuel pipe with the connection head part of the fuel pipe formed by plastic working being performed on the tip portion of a pipe body (see, for example, Patent Literature 1). The connection head part has a small plate thickness in the fuel pipe for gasoline, and thus the connection head part may buckle and bend inward when the stress that is generated in the connection head part increases.

Meanwhile, in a fuel distribution and supply device for diesel, a fuel pipe in which a connection head part made of iron and increased in thickness such that a linear flow path is obtained is brazed to a pipe body is used as a fuel pipe because a pressure as high as 200 MPa needs to be withstood (see, for example, Patent Literature 2).

It is conceivable to increase the strength of the connection head part of the fuel pipe for gasoline and prevent buckling of the connection head part by increasing the thickness of the connection head part as in the case of the connection head part of the fuel pipe for diesel. However, an increase in the thickness of the connection head part is hardly feasible because an increase in cost is entailed.

An object of one aspect of the present invention is to provide a fuel pipe in which the strength of a connection head part can be improved even without an increase in the thickness of the connection head part.

Solution to Problem

A fuel pipe according to an aspect of the present invention is a fuel pipe connected to a fuel distribution pipe distributing and supplying fuel to a plurality of fuel injection devices. The fuel pipe includes a pipe body and a connection head part fastened to the fuel distribution pipe by a cap nut. The connection head part includes a first curved portion curved in a circular shape in a reference cross-section including a central axis of the fuel pipe and abutting against a seat surface formed on an inner peripheral surface of the fuel distribution pipe, a second curved portion curved in a circular shape in the reference cross-section and locked on a locking surface formed on an inner peripheral surface of the cap nut, and a straight portion extending linearly in the reference cross-section and interconnecting the first curved portion and the second curved portion.

In the fuel pipe, stress tends to concentrate on the first curved portion and the second curved portion curved in a circular shape. However, the axial force of the cap nut can be dispersed to the straight portion since the straight portion is provided between the first curved portion and the second curved portion. As a result, the maximum stress that is generated in the first curved portion and the second curved portion is reduced, and thus the strength of the connection head part can be improved even without an increase in the thickness of the connection head part.

The straight portion may be inclined so as to spread toward a tip of the connection head part with respect to the central axis in the reference cross-section. In this fuel pipe, the straight portion spreads toward the tip of the connection head part whereas the connection head part abuts against the seat surface formed on the inner peripheral surface of the fuel distribution pipe. Accordingly, the direction in which the straight portion extends can be directed to the seat surface. As a result, the reaction force that is received from the seat surface can be received by the straight portion. In addition, it is possible to reduce the force of the component in the direction of bending of the straight portion, that is, the force of the component in the direction perpendicular to the straight portion in the reaction force received from the seat surface. As a result, the maximum stress that is generated in the connection head part is reduced, and thus the strength of the connection head part is further improved.

The straight portion may be larger in inner diameter than the pipe body. In this fuel pipe, the straight portion is larger in inner diameter than the pipe body, and thus it is possible to manufacture the connection head part both easily and inexpensively by performing plastic working on the tip portion of the pipe body.

The connection head part may be equal in plate thickness to the pipe body. In this fuel pipe, the plate thickness of the connection head part and the plate thickness of the pipe body are equal to each other. Accordingly, it is possible to manufacture the connection head part both easily and inexpensively by performing plastic working on the tip portion of the pipe body.

A line segment interconnecting a point at which the first curved portion abuts against the seat surface and a point at which the second curved portion abuts against the locking surface may be inclined so as to spread toward the tip of the connection head part with respect to the central axis in the reference cross-section. In this fuel pipe, the axial force of the cap nut is input to the connection head part from the point abutting against the seat surface and the point abutting against the locking surface. Accordingly, the direction of the axial force input to the connection head part can be directed to the seat surface by the line segment that interconnects the points spreading toward the tip of the connection head part. As a result, the strength of the connection head part is further improved.

L/m may be 0.63 or more in a case where a length of the straight portion in the reference cross-section is L and an inner diameter of the pipe body is m. In this fuel pipe, the proportion of the straight portion in the connection head part becomes relatively large and the proportion of the first curved portion and the second curved portion in the connection head part, that is, the proportion of circular parts in the connection head part becomes relatively small by L/m being 0.63 or more. As a result, the part where the maximum stress is generated is positioned in the vicinity of the pipe body, which is the base end portion of the connection head part. Accordingly, the bending moment that is generated in the connection head part is reduced, and thus the strength of the connection head part is further improved.

Advantageous Effects of Invention

According to an aspect of the present invention, it is possible to improve the strength of the connection head part even without an increase in the thickness of the connection head part.

DESCRIPTION OF EMBODIMENTS

Hereinafter, a fuel distribution pipe according to an embodiment will be described with reference to accompanying drawings. Although application of the present invention to a fuel distribution and supply device for a gasoline engine will be described in the present embodiment, the present invention may be applied to a fuel distribution and supply device for another fuel as well, examples of which include a fuel distribution and supply device for a diesel engine. In each of the drawings, the same or corresponding elements are denoted by the same reference numerals and the same descriptions will not be repeated.

Figure 1:
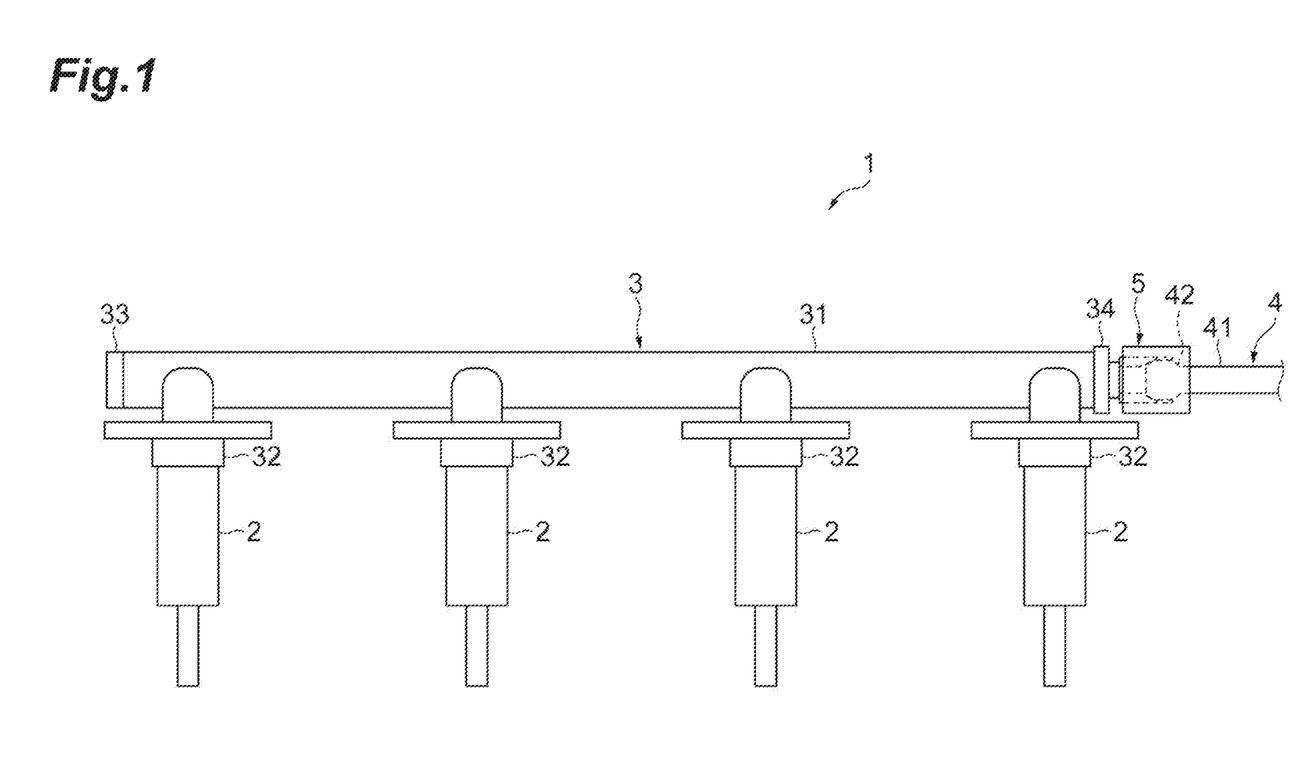
FIG. 1 is a plan view illustrating a part of a fuel distribution and supply device.

As illustrated in FIG. 1, a fuel distribution and supply device 1 distributes and supplies high-pressure fuel compressed by a high-pressure pump (not illustrated) to a fuel injection device 2 provided correspondingly to each cylinder of an engine (not illustrated). The fuel distribution and supply device 1 is also called a fuel injection rail, a fuel delivery pipe, a common rail, or the like.

Figure 2:
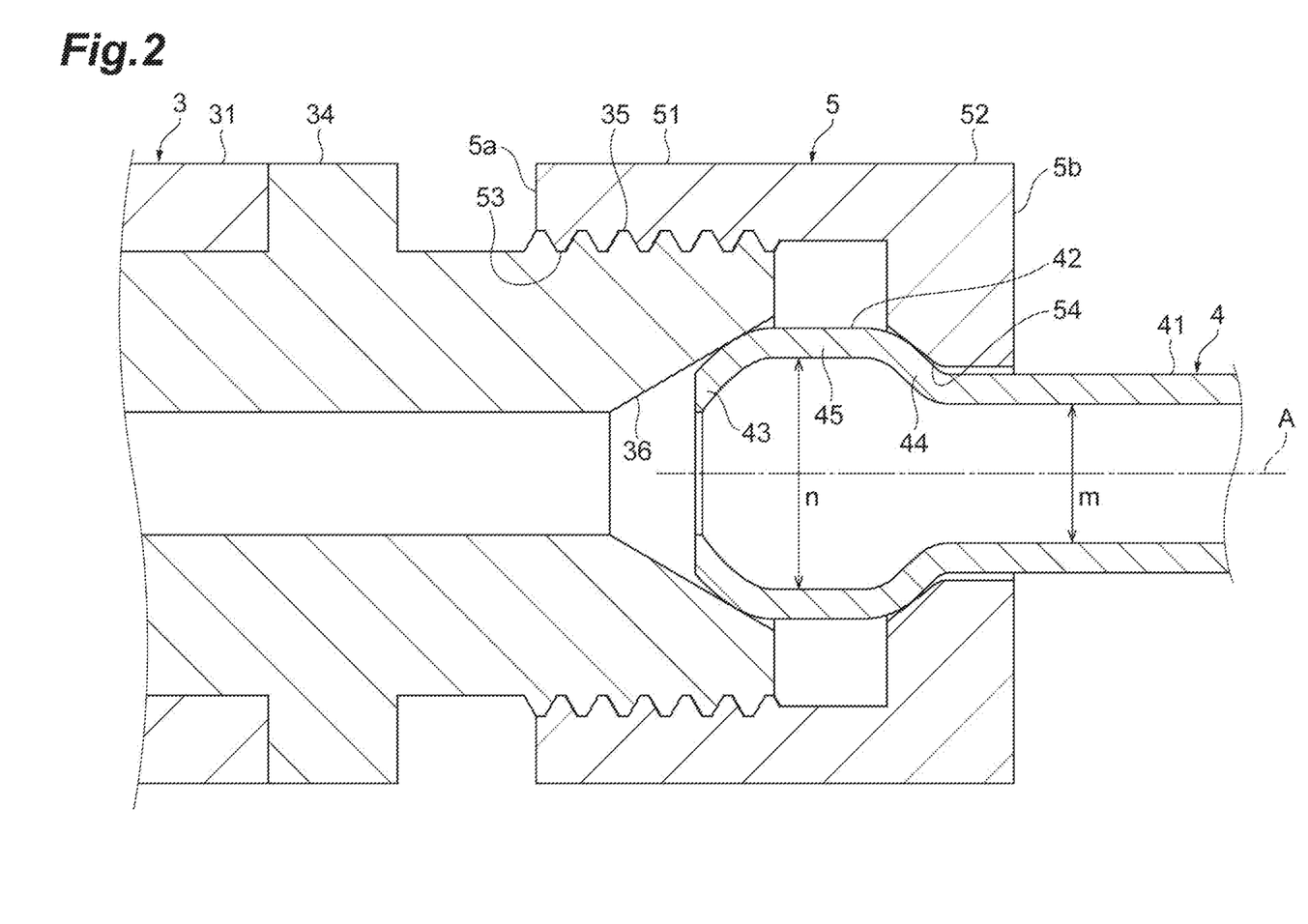
FIG. 2 is a cross-sectional view illustrating a part where a fuel distribution pipe and a fuel pipe are interconnected.

As illustrated in FIGS. 1 and 2, the fuel distribution and supply device 1 is provided with a fuel distribution pipe 3 distributing and supplying the high-pressure fuel to a plurality of the fuel injection devices 2, a fuel pipe 4 supplying the fuel distribution pipe 3 with the high-pressure fuel compressed by the high-pressure pump, and a cap nut 5 fastening the fuel pipe 4 to the fuel distribution pipe 3.

The fuel distribution pipe 3 is provided with a pipe portion 31 and a plurality of cup portions 32.

The pipe portion 31 stores the fuel pumped from the high-pressure pump in a high-pressure state in order to supply the fuel to the plurality of fuel injection devices 2. The pipe portion 31 is formed in a circular pipe shape extending linearly along the cylinder row direction (crankshaft direction) of the engine. The inner peripheral surface of the pipe portion 31 forms a fuel flow path. The pipe shape of the pipe portion 31 does not necessarily have to be the linearly extending circular pipe shape. The pipe portion 31 can be of various pipe shapes.

The pipe portion 31 is provided with a lid portion 33 fixed to one end portion of the pipe portion 31 and blocking the one end portion of the pipe portion 31 and a connecting portion 34 fixed to the other end portion of the pipe portion 31 and connected to the fuel pipe 4. The lid portion 33 and the connecting portion 34 can be fixed to the pipe portion 31 by, for example, brazing. The one end portion of the pipe portion 31, which is one of both end portions of the pipe portion 31, is on the side that is opposite to the fuel pipe 4. The other end portion of the pipe portion 31, which is the other of the two end portions of the pipe portion 31, is on the fuel pipe 4 side. A fuel pressure sensor or the like may be connected to the one end portion of the pipe portion 31 in place of the lid portion 33.

The cup portion 32 is attached to each of the plurality of fuel injection devices 2 and supplies each fuel injection device 2 with the fuel stored in the pipe portion 31. The cup portion 32 is fixed to the pipe portion 31 and holds the fuel injection device 2 such that the space between the cup portion. 32 and the fuel injection device 2 becomes airtight. The cup portion 32 can be fixed to the pipe portion 31 by, for example, brazing.

The connecting portion 34 is formed in a circular pipe shape. The inner peripheral surface of the connecting portion 34 forms a fuel flow path. The connecting portion 34 is fixed to the pipe portion 31 on the base end side and connected to the fuel pipe 4 on the tip side. A male screw 35 is engraved on the outer peripheral surface of the connecting portion 34 that is on the tip side and a seat surface 36 is formed on the inner peripheral surface of the connecting portion 34 that is on the tip side. The male screw 35 is a part for connection to the fuel pipe 4. The seat surface 36 is a part that seals the space between the fuel pipe 4 and the seat surface 36 with the fuel pipe 4 pressed.

The seat surface 36 is formed in a tapered shape (funnel shape) expanding in diameter toward the tip of the connecting portion 34 (tip of the fuel distribution pipe 3). The cross-section of the seat surface 36 that passes through the pipe axis (central axis) of the connecting portion 34 is a straight line. The inclination angle of the seat surface 36 with respect to the pipe axis of the connecting portion 34 can be, for example, 60°.

The fuel pipe 4 is provided with a pipe body 41 and a connection head part 42.

The pipe body 41 is disposed between the high-pressure pump and the fuel distribution pipe 3 and sends the high-pressure fuel compressed by the high-pressure pump to the fuel distribution pipe 3. The pipe body 41 is formed in an elongated pipe shape (circular pipe shape). The inner peripheral surface of the pipe body 41 forms a fuel flow path. The pipe body 41 has the same cross-section (same inner diameter, same outer diameter) over the entire region in the longitudinal direction. The pipe body 41 is formed of a metal material that can be plastic-worked. Stainless steel, steel, or the like is used as the material of the pipe body 41.

The connection head part 42 is connected to the fuel distribution pipe 3. The connection head part 42 is formed in a circular pipe shape. The inner peripheral surface of the connection head part 42 forms a fuel flow path. The connection head part 42 is formed by plastic working being performed on the tip portion of the pipe body 41. In other words, the connection head part 42 is formed by the tip portion of the pipe body 41 being expanded and swaged in diameter by plastic working. Accordingly, the plate thickness (wall thickness) of the connection head part 42 is equal to the plate thickness (wall thickness) of the pipe body 41. Here, the plate thicknesses being equal to each other includes a case where the plate thicknesses are substantially equal to each other as well as a case where the plate thicknesses are strictly equal to each other. Being substantially equal means that the plate thicknesses may be equal to each other in terms of design and includes variations resulting from manufacturing errors. Specifically, the plate thickness may vary by approximately 30% after the tip portion of the pipe body 41 is expanded and swaged in diameter by plastic working. Accordingly, a plate thickness that is within ±30% of the plate thickness of the pipe body 41 is a plate thickness equal to the plate thickness of the pipe body 41.

Figure 3:
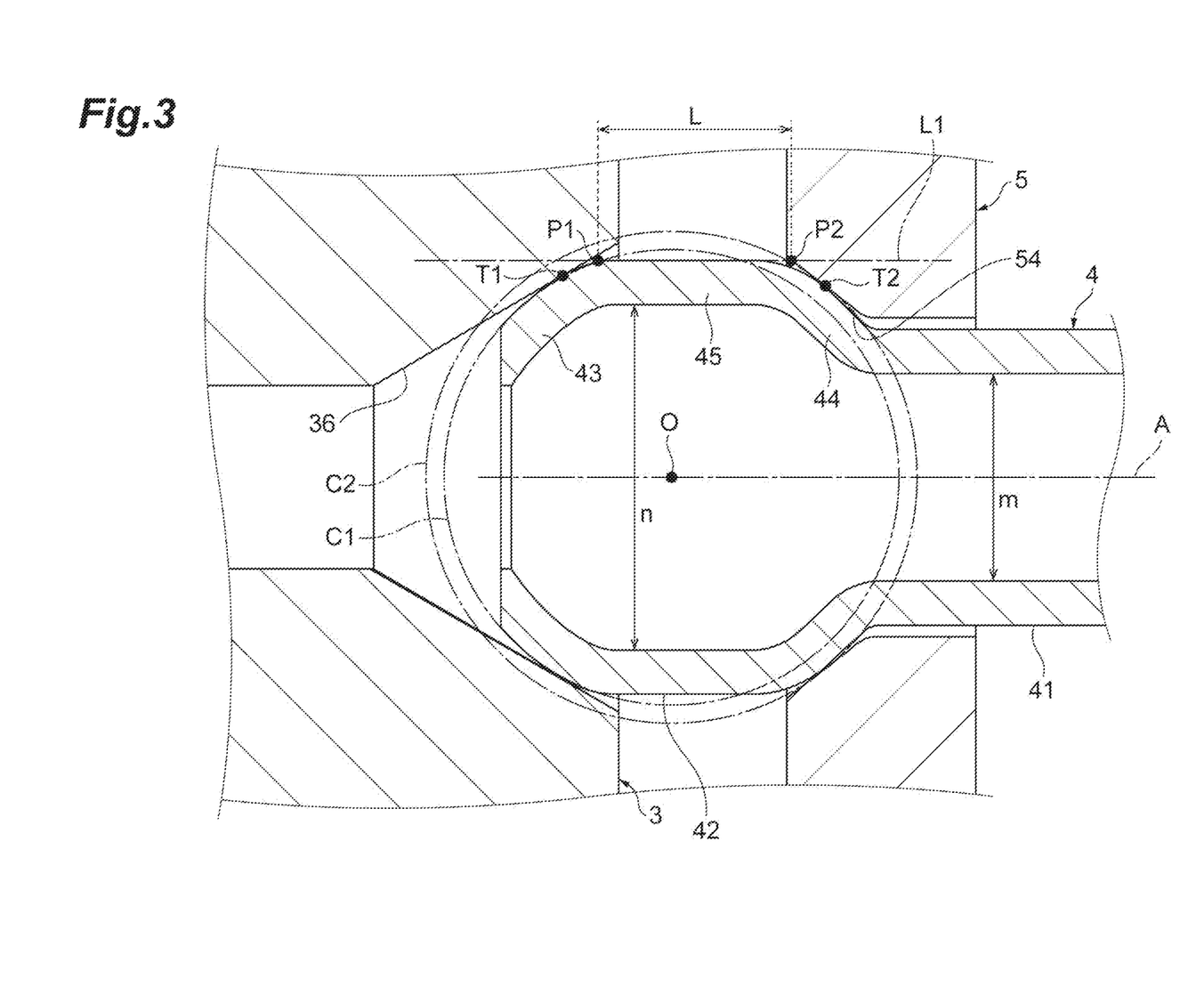
FIG. 3 is a cross-sectional view illustrating the part where the fuel distribution pipe and the fuel pipe are interconnected.

As illustrated in FIGS. 2 and 3, the connection head part 42 is provided with a first curved portion 43, a second curved portion 44, and a straight portion 45. In the following description, the central axis of the fuel pipe 4 will be referred to as a central axis A and the cross-section that is illustrated in FIG. 2, which is including the central axis A, will be referred to as a reference cross-section S.

The first curved portion 43 is a part that is positioned in the tip portion of the connection head part 42 and abuts against the seat surface 36 formed on the inner peripheral surface of the connecting portion 34 (fuel distribution pipe 3). The tip portion of the connection head part 42 is the end portion of the connection head part 42 that is on the side opposite to the pipe body 41. The first curved portion 43 is curved in a circular shape in the reference cross-section S. In other words, the first curved portion 43 is formed in a spherical shape about a point on the central axis A. The first curved portion 43 is formed by plastic working being performed on the tip portion of the pipe body 41, and thus both the outer peripheral surface and the inner peripheral surface of the first curved portion 43 are curved in a circular shape in the reference cross-section S.

The second curved portion 44 is a part that is positioned in the base end portion of the connection head part 42 and locked on a locking surface 54 formed on the inner peripheral surface of the cap nut 5. The base end portion of the connection head part 42 is the end portion of the connection head part 42 that is on the pipe body 41 side. The second curved portion 44 is curved in a circular shape in the reference cross-section S. In other words, the second curved portion 44 is formed in a spherical shape about a point on the central axis A. The second curved portion 44 is formed by plastic working being performed on the tip portion of the pipe body 41, and thus both the outer peripheral surface and the inner peripheral surface of the second curved portion 44 are curved in a circular shape in the reference cross-section S.

The outer peripheral surface of the first curved portion 43 and the outer peripheral surface of the second curved portion 44 are in a concentric relationship in which a point O on the central axis A is the center of curvature. Although the radius of the outer peripheral surface of the first curved portion 43 and the radius of the outer peripheral surface of the second curved portion 44 may be equal to each other in this case, it is preferable that the radius of the outer peripheral surface of the second curved portion 44 exceeds the radius of the outer peripheral surface of the first curved portion 43.

The straight portion 45 is a part that interconnects the first curved portion 43 and the second curved portion 44. Accordingly, the connection head part 42 is disposed in the order of the first curved portion 43, the straight portion 45, and the second curved portion 44 from the tip portion toward the base end portion. The straight portion 45 extends linearly in the reference cross-section S. In other words, the straight portion 45 is a part extending linearly between the first curved portion 43 and the second curved portion 44 in the reference cross-section S. Here, the part extending linearly in the reference cross-section S refers to a part extending substantially linearly in the reference cross-section S. Specifically, the part extending linearly in the reference cross-section S refers to a part where the flatness of the outer peripheral surface or the inner peripheral surface in the reference cross-section S is within 2 mm. In other words, the part where the flatness of the outer peripheral surface or the inner peripheral surface is within 2 mm in the reference cross-section S is the straight portion 45. The outer peripheral surface and the inner peripheral surface of the connection head part 42 are represented by lines in the reference cross-section S. Accordingly, in the reference cross-section S, the part that is positioned between two straight lines in which the outer peripheral surface or the inner peripheral surface is disposed in parallel at an interval of 2 mm is the straight portion 45. In this case, the flatness is preferably within 1.5 mm and more preferably within 1.0 mm. The straight portion 45 is formed by plastic working being performed on the tip portion of the pipe body 41, and thus both the outer peripheral surface and the inner peripheral surface of the straight portion 45 extend linearly in the reference cross-section S. The straight portion 45 will be described in detail later.

As described above, the connection head part 42 is formed by plastic working being performed on the tip portion of the pipe body 41, and thus an inner diameter n of the straight portion 45 of the connection head part 42 exceeds an inner diameter in of the pipe body 41. Although the ratio of the inner diameter n of the straight portion 45 to the inner diameter m of the pipe body 41 is not particularly limited, it is preferable that n/m ranges from, for example, 1.1 to 2.5 and it is more preferable that n/m ranges from, for example, 1.1 to 2.0.

The cap nut 5 is formed in a cylindrical shape, with a hole formed in the radial center portion of the cap nut 5, such that the connection head part 42 is inserted on the inner peripheral surface side of the cap nut 5. The cap nut 5 is provided with a screw portion 51 and a locking portion 52.

The screw portion 51 is formed in the end portion of the cap nut 5 that is on one end surface 5a side. The locking portion 52 is formed in the end portion of the cap nut 5 that is on the other end surface 5b side. The one end surface 5a of the cap nut 5, which is one of both end surfaces of the cap nut 5 in the central axis direction, is on the fuel distribution pipe 3 side. The other end surface 5b of the cap nut 5, which is the other of the two end surfaces of the cap nut 5 in the central axis direction, is on the fuel pipe 4 side (side that is opposite to the fuel distribution pipe 3).

A female screw 53 is engraved on the inner peripheral surface of the screw portion 51. The female screw 53 is a part for fastening the fuel pipe 4 to the fuel distribution pipe 3 by means of the cap nut 5 by screwing with the male screw 35 of the connecting portion 34.

The locking surface 54 is formed on the inner peripheral surface of the locking portion 52. The locking surface 54 is a part for locking the connection head part 42 inserted into the cap nut 5 from the one end surface 5a side from the other end surface 5b side. The locking surface 54 is formed in a tapered shape (funnel shape) expanding in diameter from the other end surface 5b side toward the one end surface 5a side. The cross-section of the locking surface 54 that passes through the pipe axis (central axis) of the connection head part 42 is a straight line. The inclination angle of the locking surface 54 with respect to the pipe axis of the connection head part 42 can be, for example, 60° to 80°.

When the fuel pipe 4 is fastened to the fuel distribution pipe 3 by means of the cap nut 5, the female screw 53 is screwed into the male screw 35 in a state where the pipe body 41 is inserted in the cap nut 5 from the one end surface 5a side. Then, the second curved portion 44 of the connection head part 42 inserted in the cap nut 5 abuts against the locking surface 54 and the connection head part 42 is pulled to the fuel distribution pipe 3 side by the cap nut 5. Then, the first curved portion 43 is pressed to the seat surface 36 by the axial force of the cap nut 5 with respect to the fuel distribution pipe 3 and the second curved portion 44 is pressed to the locking surface 54. As a result, the fuel distribution pipe 3 and the fuel pipe 4 are fastened by the cap nut 5 and the fuel distribution pipe 3 and the fuel pipe 4 are connected and fixed.

Next, the straight portion 45 will be described in more detail.

Figure 4:
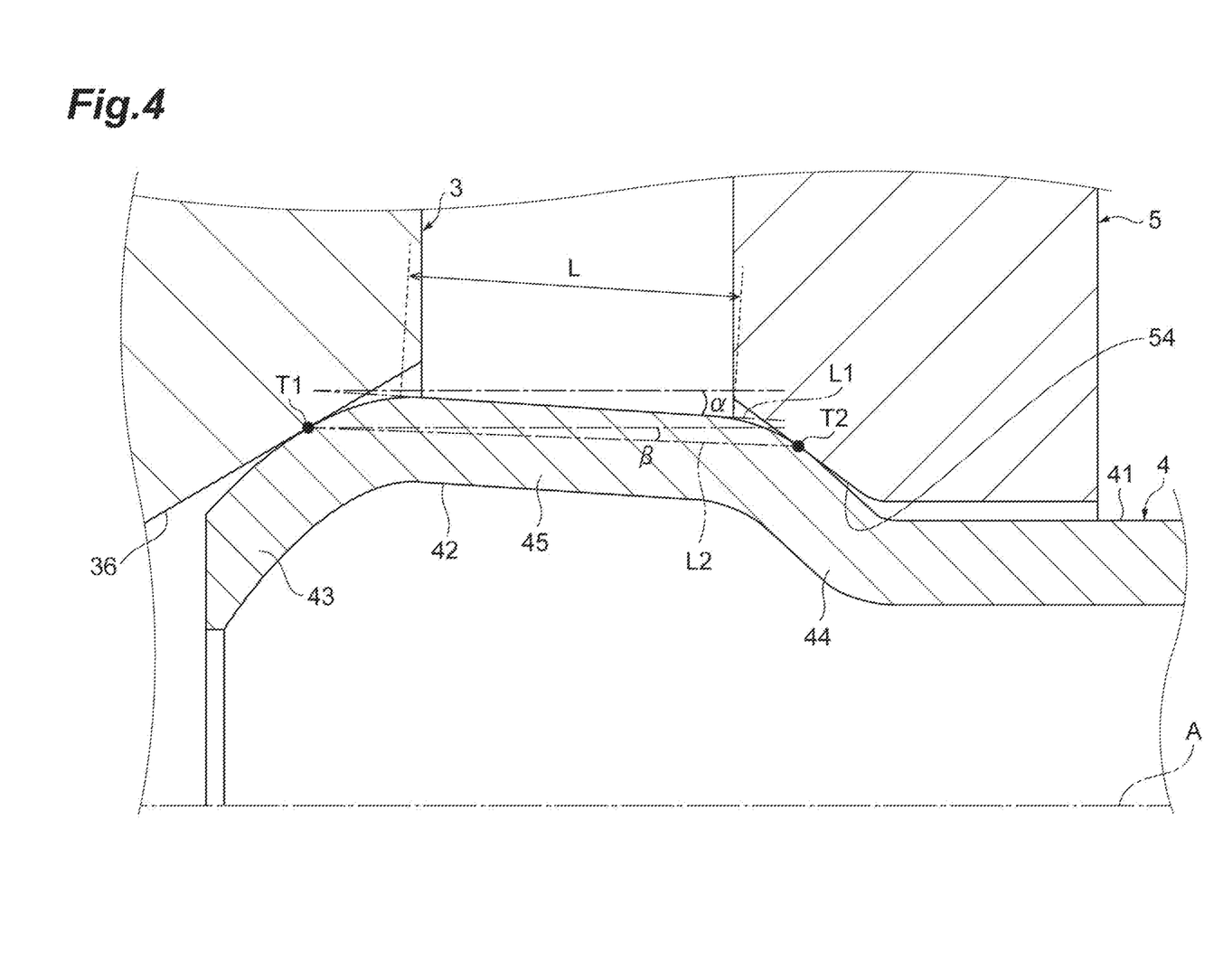
FIG. 4 is a cross-sectional view illustrating the part where the fuel distribution pipe and the fuel pipe are interconnected.

As illustrated in FIGS. 3 and 4, the straight portion 45 is inclined so as to spread toward the tip of the connection head part 42 with respect to the central axis A in the reference cross-section S. In other words, the straight portion 45 is formed in a tubular and truncated cone shape about the central axis A. As described above, the straight portion 45 is formed by plastic working being performed on the tip portion of the pipe body 41, and thus both the outer peripheral surface and the inner peripheral surface of the straight portion 45 are inclined so as to spread toward the tip of the connection head part 42 with respect to the central axis A in the reference cross-section S. An angle α is less than 0 (α<0) in a case where an extension line of the outer peripheral surface of the straight portion 45 is a straight line L1 and the angle of the direction in which the straight line L1 is closed toward the tip of the connection head part 42 with respect to the central axis A is the angle α in the reference cross-section S.

In the reference cross-section S, the point at which the first curved portion 43 abuts against the seat surface 36 is defined as a point T1, the point at which the second curved portion 44 abuts against the locking surface 54 is defined as a point T2, and a line segment L2 connects the point T1 and the point T2 to each other. In this case, the line segment L2 is inclined so as to spread toward the tip of the connection head part 42 with respect to the central axis A. In other words, an angle β is less than 0 (β<0) in a case where the angle of the direction in which the line segment L2 is closed toward the tip of the connection head part 42 with respect to the central axis A is the angle β in the reference cross-section S.

In a case where the length of the straight portion 45 in the reference cross-section S is a length L and the inner diameter of the pipe body 41 is the inner diameter m, length L/inner diameter m is 0.63 or more (L/m≥0.63). The length L of the straight portion 45 in the reference cross-section S is obtained as follows. In the reference cross-section S, a circle passing through the outer peripheral surface of the first curved portion 43 about the point O is defined as a circle C1, a circle passing through the outer peripheral surface of the second curved portion 44 about the point O is defined as a circle C2, the extension line of the outer peripheral surface of the straight portion 45 is defined as the straight line L1, the point of intersection between the circle C1 and the straight line L1 in the vicinity of the first curved portion 43 is defined as a point P1, and the point of intersection between the circle C2 and the straight line L1 in the vicinity of the second curved portion 44 is defined as a point P2. Then, the length from the point P1 to the point P2 is defined as a length L of the straight portion 45 in the reference cross-section S.

As described above, in the fuel pipe 4 according to the present embodiment, stress tends to concentrate on the first curved portion 43 and the second curved portion 44 curved in a circular shape. However, the axial force of the cap nut 5 can be dispersed to the straight portion 45 since the straight portion 45 is provided between the first curved portion 43 and the second curved portion 44. As a result, the maximum stress that is generated in the first curved portion 43 and the second curved portion 44 is reduced, and thus the strength of the connection head part 42 can be improved even without an increase in the thickness of the connection head part 42.

In the fuel pipe 4, the straight portion 45 spreads toward the tip of the connection head part 42 whereas the connection head part 42 abuts against the seat surface 36 formed on the inner peripheral surface of the fuel distribution pipe 3. Accordingly, the direction in which the straight portion 45 extends can be directed to the seat surface 36. As a result, the reaction force that is received from the seat surface 36 can be received by the straight portion 45. In addition, it is possible to reduce the force of the component in the direction of bending of the straight portion 45, that is, the force of the component in the direction perpendicular to the straight portion 45 in the reaction force received from the seat surface 36. As a result, the maximum stress that is generated in the connection head part 42 is reduced, and thus the strength of the connection head part 42 is further improved.

In the fuel pipe 4, the plate thickness of the connection head part 42 and the plate thickness of the pipe body 41 are equal to each other. Accordingly, it is possible to manufacture the connection head part 42 both easily and inexpensively by performing plastic working on the tip portion of the pipe body 41.

In the fuel pipe 4, the axial force of the cap nut 5 is input to the connection head part 42 from the point T1 abutting against the seat surface 36 and the point T2 abutting against the locking surface 54. Accordingly, the direction of the axial force input to the connection head part 42 can be directed to the seat surface 36 by the line segment L2 that interconnects the point T1 and the point T2 spreading toward the tip of the connection head part 42. As a result, the strength of the connection head part 42 is further improved.

In the fuel pipe 4, the proportion of the straight portion 45 in the connection head part 42 becomes relatively large and the proportion of the first curved portion 43 and the second curved portion 44 in the connection head part 42, that is, the proportion of circular parts in the connection head part 42 becomes relatively small by L/m being 0.63 or more. As a result, the part where the maximum stress is generated is positioned in the vicinity of the pipe body 41, which is the base end portion of the connection head part 42. Accordingly, the bending moment that is generated in the connection head part 42 is reduced, and thus the strength of the connection head part 42 is further improved.

Here, the inventors of the present invention conducted a simulation regarding the relationship between the angle α of the straight line L1 with respect to the central axis A, the angle β of the line segment L2 with respect to the central axis A, and the maximum stress that is generated in the connection head part 42. The result of the simulation is illustrated in FIG. 5.

Figure 5:
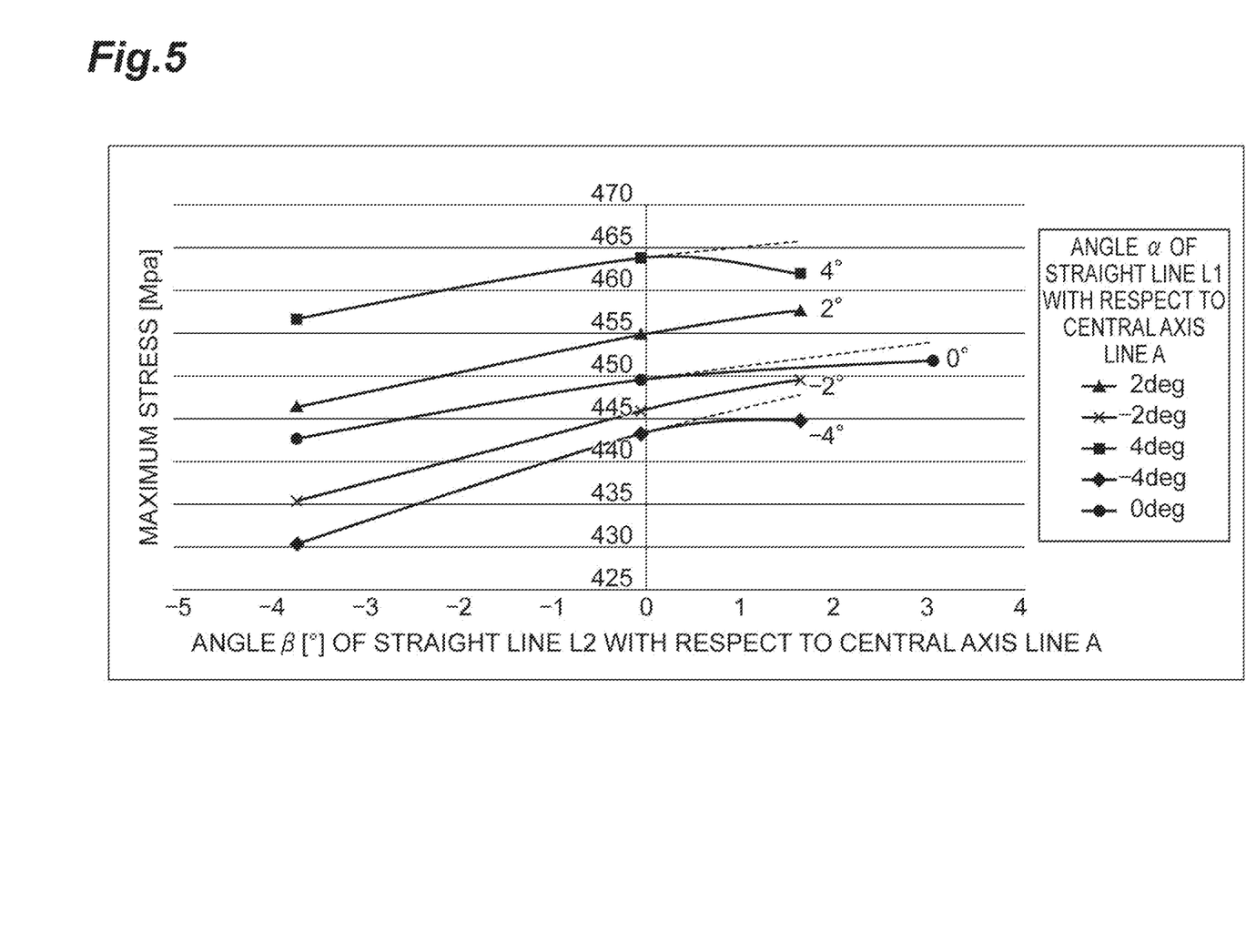
FIG. 5 is a graph illustrating a simulation result.

As illustrated in FIG. 5, in a case where the angle α is less than 0, the maximum stress generated in the connection head part 42 is smaller, regardless of the angle β, than in a case where the angle α is equal to or greater than 0. It was found from this result that the maximum stress generated in the connection head part 42 is reduced by the straight portion 45 being inclined so as to spread toward the tip of the connection head part 42 with respect to the central axis A in the reference cross-section S.

Especially, in a case where the angle α is less than 0 and the angle is less than 0, the maximum stress generated in the connection head part 42 is remarkably small. It was found from this result that the maximum stress generated in the connection head part 42 becomes remarkably small by the straight portion 45 and the line segment that interconnects the point T1 at which the first curved portion 43 abut against the seat surface 36 and the point T2 at which the second curved portion 44 is locked on the locking surface 54 of the cap nut 5 being inclined so as to spread toward the tip of the connection head part 42 with respect to the central axis A in the reference cross-section S.

As illustrated in FIGS. 3 and 4, length L/inner diameter m is 0.63 or more (L/m≥0.63) in a case where the length of the straight portion 45 in the reference cross-section S is the length L and the inner diameter of the pipe body 41 is the inner diameter m.

The length L of the straight portion 45 in the reference cross-section S is obtained as follows. In the reference cross-section S, a circle passing through the outer peripheral surface of the first curved portion 43 about the point O is defined as the circle C1, a circle passing through the outer peripheral surface of the second curved portion 44 about the point O is defined as the circle C2, the extension line of the outer peripheral surface of the straight portion 45 is defined as the straight line L1, the point of intersection between the circle C1 and the straight line L1 in the vicinity of the first curved portion 43 is defined as the point P1, and the point of intersection between the circle C2 and the straight line L1 in the vicinity of the second curved portion 44 is defined as the point P2. Then, the length from the point Pt to the point P2 is defined as a length L of the straight portion 45 in the reference cross-section S.

Figure 6:
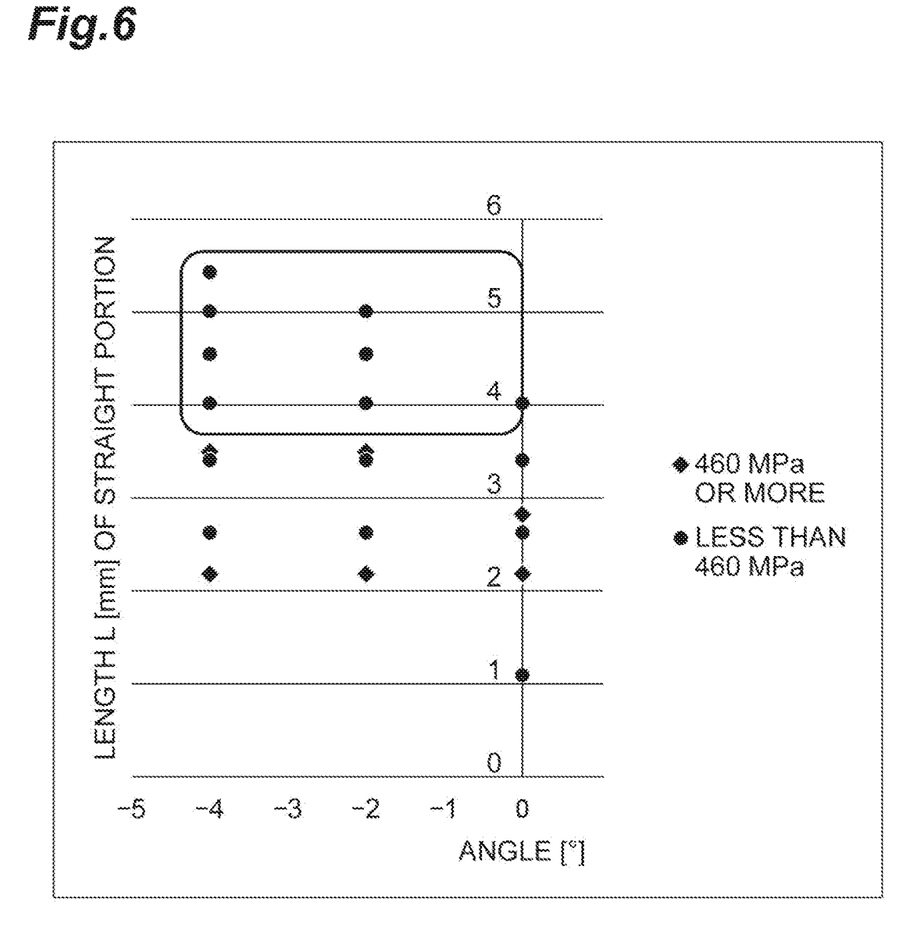
FIG. 6 is a graph illustrating a simulation result.

Here, the inventors of the present invention conducted a simulation regarding the relationship between the angle α of the straight line L1 with respect to the central axis A, the length L of the straight portion 45, and the maximum stress that is generated in the connection head part 42. In this simulation, the inner diameter m of the pipe body 41 was set to 5.5 mm. The result of the simulation is illustrated in FIG. 6. Normally, it is considered that the connection head part 42 is not deformed even when the maximum stress generated in the connection head part 42 exceeds 460 MPa. In FIG. 6, however, a reference stress of 460 MPa is set from the viewpoint of further preventing deformation of the connection head part 42.

As illustrated in FIG. 6, the maximum stress generated in the connection head part 42 does not exceed 460 MPa in a case where the length L of the straight portion 45 is 3.5 mm or more whereas some cases where the maximum stress generated in the connection head part 42 exceeds 460 MPa are found in a case where the length L of the straight portion 45 is less than 3.5 mm. It was found from this result that deformation of the connection head part 42 can be further prevented if the length L of the straight portion 45 is 3.5 mm or more in a case where the inner diameter m of the pipe body 41 is 5.5 mm.

Figure 7:
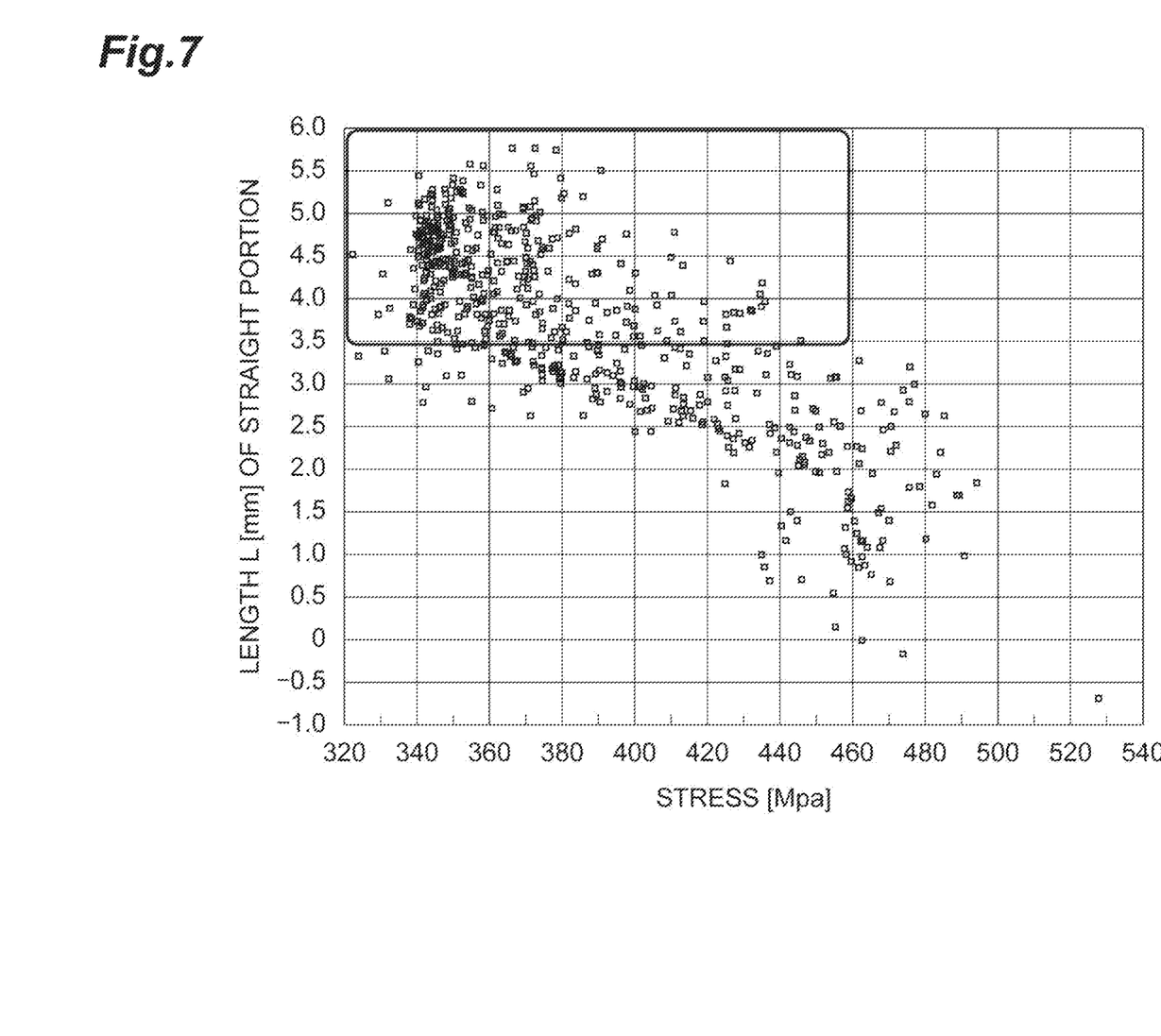
FIG. 7 is a graph illustrating a simulation result.

The inventors of the present invention conducted a simulation regarding the relationship between the stress that is generated at any point of the connection head part 42 and the length L of the straight portion 45 as well. In this simulation, the inner diameter m of the pipe body 41 was set to 5.5 mm. The result of the simulation is illustrated in FIG. 7. In FIG. 7 as well as FIG. 6, a reference stress of 460 MPa is set from the viewpoint of further preventing deformation of the connection head part 42.

As illustrated in FIG. 7, the stress generated at any point of the connection head part 42 does not exceed 460 MPa in a case where the length L of the straight portion 45 is 3.5 mm or more whereas some cases where the stress generated at any point of the connection head part 42 exceeds 460 MPa are found in a case where the length L of the straight portion 45 is less than 3.5 mm. It was found from this result that deformation of the connection head part 42 can be further prevented if the length L of the straight portion 45 is 3.5 mm or more in a case where the inner diameter m of the pipe body 41 is 5.5 mm.

As described above, in FIGS. 6 and 7 alike, the stress generated in the connection head part 42 is kept below 460 MPa by the length L of the straight portion 45 being 3.5 mm or more with the pipe body 41 having the inner diameter m of 5.5 mm. The ratio of the length L of the straight portion 45 to the inner diameter m of the pipe body 41 that is calculated in that state is approximately equal to 0.63 (L/m=0.63). Accordingly, it is assumed that deformation of the connection head part 42 can be further prevented by length L/inner diameter m being set to 0.63 or more.

Although a preferred embodiment of the present invention has been described above, the present invention is not limited to the above-described embodiment.

REFERENCE SIGNS LIST

1: fuel distribution and supply device, 2: fuel injection device, 3: fuel distribution pipe, 4: fuel pipe, 5: cap nut, 5a: one end surface, 5b: the other end surface, 31: pipe portion, 32: cup portion, 33: lid portion, 34: connecting portion, 35: male screw, 36: seat surface, 41: pipe body, 42: connection head part, 43: first curved portion, 44: second curved portion, 45: straight portion, 51: screw portion, 52: locking portion, 53: female screw, 54: locking surface, A: central axis.

The invention claimed is:

1. A fuel pipe connected to a fuel distribution pipe distributing and supplying fuel to a plurality of fuel injection devices, the fuel pipe comprising:

a pipe body; and a connection head part fastened to the fuel distribution pipe by a cap nut, wherein the connection head part includes a first curved portion curved in a circular shape in a reference cross-section including a central axis of the fuel pipe and abutting against a seat surface formed on an inner peripheral surface of the fuel distribution pipe, a second curved portion curved in a circular shape in the reference cross-section and locked on a locking surface formed on an inner peripheral surface of the cap nut, and a straight portion extending linearly in the reference cross-section and interconnecting the first curved portion and the second curved portion, and wherein the straight portion is inclined so as to spread toward a tip of the connection head part with respect to the central axis in the reference cross-section.

2. The fuel pipe according to claim 1, wherein the straight portion is larger in inner diameter than the pipe body.

3. The fuel pipe according to claim 1, wherein the connection head part is equal in plate thickness to the pipe body.

4. The fuel pipe according to claim 1, wherein L/m is 0.63 or more in a case where a length of the straight portion in the reference cross-section is L and an inner diameter of the pipe body is m.

5. A fuel pipe connected to a fuel distribution pipe distributing and supplying fuel to a plurality of fuel injection devices, the fuel pipe comprising:

a pipe body; and a connection head part fastened to the fuel distribution pipe by a cap nut, wherein the connection head part includes a first curved portion curved in a circular shape in a reference cross-section including a central axis of the fuel pipe and abutting against a seat surface formed on an inner peripheral surface of the fuel distribution pipe, a second curved portion curved in a circular shape in the reference cross-section and locked on a locking surface formed on an inner peripheral surface of the cap nut, and a straight portion extending linearly in the reference cross-section and interconnecting the first curved portion and the second curved portion, and wherein a line segment interconnecting a point at which the first curved portion abuts against the seat surface and a point at which the second curved portion abuts against the locking surface is inclined so as to spread toward the tip of the connection head part with respect to the central axis in the reference cross-section.

6. The fuel pipe according to claim 5, wherein the straight portion is larger in inner diameter than the pipe body.

7. The fuel pipe according to claim 5, wherein the connection head part is equal in plate thickness to the pipe body.

8. The fuel pipe according to claim 5, wherein L/m is 0.63 or more in a case where a length of the straight portion in the reference cross-section is L and an inner diameter of the pipe body is m.

* * * * *